Patented Mar. 3, 1942

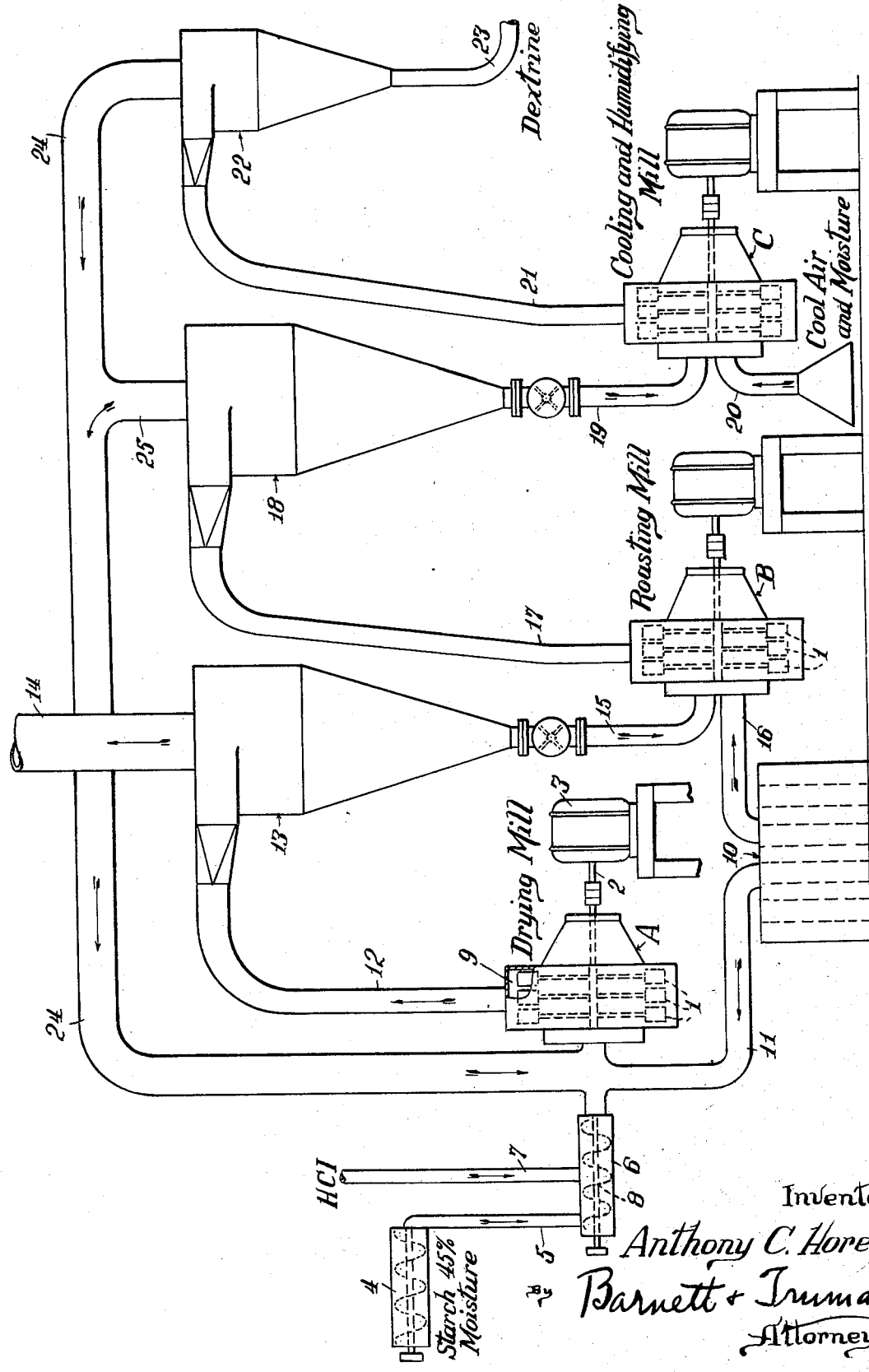

2,274,789

UNITED STATES PATENT OFFICE 2,274,789

PRODUCTION OF DEXTRINE

Anthony C. Horesi, Downers Grove, Ill., assignor to Corn Products Refining Company, New York, N. Y., a corporation of New Jersey Application July 27, 1939, Serial No. 286,837

2 Claims. (Cl. 127—38)

This invention relates to the treatment of starch for the manufacture of dextrines and British gums.

The ordinary process of making dextrines and British gums (which latter will be referred to herein as dextrines—the process being generally the same except that in the case of British gum no acid is used) as this process has been practiced heretofore involves: drying the starch from the washing filters, which contains about 45% water, in a drying kiln for about twenty-four hours to a moisture content of about 12%; grinding the starch to a powder; drying the powder in a Huhm drier to about 5% moisture; mixing with the dried, powdered starch a certain amount of acid, or other converting agent (except as stated in the case of the British gums); roasting batches of the dried acidulated starch in dextrine cookers, which are closed vessels provided with heating means and agitators, at a temperature from 220° to 400° F. for from 3 to 24 hours, depending upon the kind or type of dextrine desired; cooking the dextrine to about 100° F. and allowing it to absorb moisture from the atmosphere until it contains the desired amount of moisture; and finally screening out the charred and lumpy particles.

The objects of the present invention are, among other incidental objects to be referred to hereinafter: to shorten the process including the preliminary dehydrating steps, the dextrinizing operation and the cooling and humidifying steps, so that the operation requires but a few seconds instead of several hours; to make the process continuous; to simplify the acidification steps; to obviate the necessity of screening the product by employment of methods which involve substantially no charring or lumping of the product; to better control the dextrinization whereby the particular type of product, one for example having the desired solubility, may be obtained with greater certainty and accuracy; to eliminate or minimize the possibility of dust explosions; and, generally, to simplify, cheapen and improve the process.

Apparatus for practicing the process is shown, diagrammatically, in the accompanying drawing.

Referring to the drawing, A designates a starch drying or dehydrating mill; B a roasting or dextrinizing mill; and C a cooling and humidifying mill. These mills are substantially alike. The material treated is passed through the mills with currents of air (heated or cooled as the case may be) and is subjected, while in suspension in the air, to a beating operation by means of the beaters 1 pivoted to shafts 2 driven, in each case, by a motor 3.

It will be understood that the invention is not limited to the construction of the mill. Any apparatus might be used by means of which the starch material is beaten, rapidly and continuously, while being subjected to a current of heated or cooled air, as the case may be.

Preferably as a matter of convenience, the starch treated is the starch as it comes from the usual washing filters in which the starch flushed from the starch tables is first dewatered and then washed. This starch ordinarily has a moisture content of 45%. It is in a moist but solid state. As shown in the drawing, the starch from the filters is fed by means of a conveyor 4 through a pipe 5 leading to a mixing device 6, which also serves as a conveyor into which hydrochloric acid or other converting agent is introduced through the pipe 7; the acid being thoroughly mixed with the moist starch by means of the screw 8 of the conveyor-mixer 6 and the acidulated starch is then delivered to the beating chamber 9 of the drying mill A. Heated air is introduced into the mill A from the heater 10 through pipe 11. The dried starch, dried to a moisture content suitable for dextrinization in the roasting mill B, that is, to a moisture content substantially below the moisture content of air dry starch, passes through pipe 12 to a cyclone collector 13 in which most of the air is separated from the starch and escapes to the atmosphere (or if desired to another collector) through the pipe 14. The starch collected in the cyclone collector 13 passes through pipe 15 to the roasting or dextrinizing mill B which receives heated air from heater 10 through pipe 16. The dry starch, suspended in the heated air passing through the mill B and subjected to the violent beating of the beating arms 1, is converted to dextrine of the desired solubility and then passes through pipe 17 to the cyclone collector 18 from which the solid material, starch partially or wholly dextrinized, passes through pipe 19 to the cooling and humidifying mill C into which cooled air and moisture is introduced through the pipe 20. The cooled and humidified dextrine passes from mill C through pipe 21 to a cyclone dust collector 22 having a discharge pipe 23 for the solid matter and an air discharge pipe 24, with which the air discharge pipe 25 of collector 18 communicates and which preferably leads back to the dry mill A, since the air from the collectors 18 and 22 will ordinarily contain a certain amount of very dry material of dust-like character, which it is desirable to save and which, furthermore, should not be discharged to the atmosphere for fear of dust explosion.

The characteristics of the dextrine intended to be produced, particularly solubility and reducing sugar content (which latter, generally speaking, should be kept to a minimum) may be determined by proper control of the various determining factors, to wit, the amount of acid or other converting agent used, the temperatures of the air passing through the drying and roasting mills A and B and the volumes of air in proportion to the amount of starch treated passed through the mills per unit of time.

Furthermore, if desired, particularly where high solubility is required, the material from the roasting mill B may be returned, in part or wholly, directly to the roasting mill B or preferably first to the mill A, for a re-dextrinizing treatment. This re-treatment of the material may be repeated as often, in one dextrinizing unit, or successively in as many dextrinizing units as necessary to obtain the desired degree of dextrinization.

The temperatures in the mill A are very much higher than the gelatinizing temperature of starch having 45% of moisture but no gelatinization of the starch results because of the rapidity with which evaporation of water takes place due to the action of the beaters.

The following are specific examples of the reduction of the process of this invention to practice. These examples are purely informatory and typical. The invention is not limited thereto. The intention is to cover all equivalents and also all modifications within the scope of the appended claims.

The process can utilize any suitable converting or dextrinizing agent known to the art, such as acids, alkalies, chlorine gas and oxidizing agents, for example calcium peroxide and hydrogen peroxide.

*Example 1.*—45% moisture starch cake is acidulated with sufficient hydrochloric acid to give an acidity of 0.2%, based on the dry weight of the starch, and is fed into mill A at the rate of 5 pounds per minute, together with air heated to a temperature of 300° F. and introduced into the mill at the rate of 2000 cubic feet per minute.

The moisture content of the starch is reduced by the treatment in the drying mill A from about 45% moisture to about 4%.

The dried starch leaves mill A at a temperature of about 200° F. The dried starch is introduced into the roasting mill which receives air heated to about 300° F. at the rate of 2000 cubic feet per minute.

The dextrine leaves the roasting mill at a temperature of about 220° F. It is cooled in the mill C to a temperature of 100° F. by a stream of room temperature air flowing through mill C at the rate of 2000 cubic feet per minute. The air is humidified so as to enable the dry dextrine to absorb about 3% or more of moisture.

A product produced as given in this example has been found to have the following characteristics: moisture 3.5%; soluble substances 4.4%; reducing sugars 1.05%.

*Example 2.*—The procedure is the same as in Example 1 except that the material from the roasting mill B is returned to the drying mill A, involving increase of its temperature to about 280° F. at the point of entry into the roasting mill B. Such product had the following characteristics:

| | Per cent |
|---|---|
| Moisture | 2.32 |
| Soluble substances | 10.4 |
| Reducing sugars | 1.5 |

*Example 3.*—A 45% moisture starch is treated the same as in Example 1 except that the volume of 300° F. air is increased to 4000 cubic feet per minute instead of 2000 cubic feet per minute. This causes the dried starch to be dextrinized at 260° F. instead of at 220° F. with the result that the product analyzes as follows:

| | Per cent |
|---|---|
| Moisture | 3.42 |
| Solubles | 18.4 |
| Reducing sugars | 0.81 |

*Example 4.*—The process is the same as in Example 3 except that the material is subjected to two roasting operations as described above. The product analyzes as follows:

| | Per cent |
|---|---|
| Moisture | 2.38 |
| Solubles | 42.0 |
| Reducing sugars | 1.84 |

*Example 5.*—The procedure is the same as in Example 3 except that the amount of acid converting agent is 0.1% instead of 0.2% based upon the weight of the starch. The product analyzes as follows:

| | Per cent |
|---|---|
| Moisture | 2.52 |
| Solubles | 7.80 |
| Reducing sugars | 0.37 |

*Example 6.*—The procedure is the same as in Example 5 except that the product is re-roasted. The analysis is as follows:

| | Per cent |
|---|---|
| Moisture | 2.05 |
| Solubles | 20.6 |
| Reducing sugars | 0.95 |

The operating data, depending upon the characteristics desired in the product, may be very widely varied, and will have to be varied over wide ranges in order to obtain dextrines of the different varieties now on the market, for example dextrines, the solubilities of which may vary from 1 to 100%. The air volumes may vary from 500 to 50,000 cubic feet per minute at the mill intake.

The air temperatures in the drying mill may vary from 300° to 1500° F. The approximate range of dextrinizing temperatures is between 220° F. and 500° F. The moisture in the dried starch, when prepared for dextrinization, will be between 2% and 5%. The acidity, when hydrochloric acid is used, will ordinarily vary from 0.1% to 0.2% based upon the weight of dry starch.

The starch treated need not necessarily be raw, non-modified starch. It might be a thin boiling starch or chlorinated starch or blends of modified starches with dextrines and/or British gums. By dextrinization is intended partial as well as complete conversion of the starch to dextrine. In the claims the term "dextrine" is intended to include British gums which are usually classed with dextrines.

I claim:

1. Continuous process for the production of dextrine which comprises: drying starch to a moisture content of about 2%–5%; and subjecting the dried starch to a beating operation suspended in air heated to a temperature sufficient to dextrinize the starch.

2. Continuous process for the production of dextrine which comprises: subjecting the starch to a drying operation which reduces the moisture content to one suitable for dextrinization of the starch by roasting; subjecting the dried starch to a beating operation while the starch is suspended in air heated to a temperature sufficient to dextrinize it; returning part of the dextrinized starch to the drying operation for re-treatment; subjecting the dextrine from the dextrinizing operation to a beating operation in suspension in cool and humid air; separating the major portion of the solids from this air and returning the air with the residual solids to the drying operation.

ANTHONY C. HORESI.